(12) United States Patent
Simofi-Ilyes et al.

(10) Patent No.: US 7,291,957 B2
(45) Date of Patent: Nov. 6, 2007

(54) UNIVERSAL TERMINAL BAR STRUCTURE WITH GROUND CONTACTING FEATURE INTEGRATED INTO A BODY STRUCTURE WITH VERSATILE RFI SUPPRESSION FOR ELECTRIC MOTORS

(75) Inventors: Attila Simofi-Ilyes, London (CA); Stefan Smorowski, London (CA); Steven VanHorne, St. Thomas (CA); Rod VanWyck, London (CA); Andrew Lakerdas, London (CA)

(73) Assignee: Siemens VDO Automotive Canada Inc., Chatham (CA)

( * ) Notice: Subject to any disclaimer, the term of this patent is extended or adjusted under 35 U.S.C. 154(b) by 365 days.

(21) Appl. No.: 11/070,174

(22) Filed: Mar. 2, 2005

(65) Prior Publication Data

US 2005/0196993 A1    Sep. 8, 2005

Related U.S. Application Data

(60) Provisional application No. 60/550,474, filed on Mar. 5, 2004.

(51) Int. Cl.
*H02K 13/00* (2006.01)
(52) U.S. Cl. ........................ 310/249; 310/239
(58) Field of Classification Search ................. 310/239, 310/249, 68 R, 71
See application file for complete search history.

(56) References Cited

U.S. PATENT DOCUMENTS

| 2,242,333 A | 5/1941 | Thunberg |
| 4,329,605 A | 5/1982 | Angi et al. .................... 310/68 |
| 4,342,934 A | 8/1982 | Van Wijhe et al. ......... 310/239 |
| 4,754,184 A | 6/1988 | Morikane et al. ........... 310/239 |
| 4,870,309 A | 9/1989 | Hosoya ........................ 310/71 |
| 5,099,163 A | 3/1992 | Zenmei ....................... 310/239 |
| 5,148,073 A | 9/1992 | Tamura ....................... 310/239 |
| 5,196,750 A | 3/1993 | Strobl ......................... 310/239 |
| 5,208,499 A | 5/1993 | Barber et al. ................. 310/51 |
| 5,306,974 A | 4/1994 | Bates .......................... 310/68 |
| 5,313,126 A | 5/1994 | Forsythe et al. .............. 310/51 |
| 5,414,318 A | 5/1995 | Shimizu et al. ............. 310/239 |
| 5,434,463 A | 7/1995 | Horski ....................... 310/248 |
| 5,444,320 A | 8/1995 | Clarke et al. ............... 310/239 |
| 5,539,264 A | 7/1996 | Kuragaki et al. ........... 310/239 |
| 5,610,456 A | 3/1997 | Wille et al. ................... 310/58 |
| 5,734,219 A | 3/1998 | Horski et al. ............... 310/240 |

(Continued)

FOREIGN PATENT DOCUMENTS

EP        0612137        8/1994

*Primary Examiner*—Dang Le
*Assistant Examiner*—Nguyen N. Hanh

(57) ABSTRACT

A method of providing RFI suppression in a DC motor provides a universal terminal bar structure 70 including a positive terminal bar 72 and a negative terminal bar 76, a first choke 80 electrically connected with the positive terminal bar, a second choke 82 electrically connected with the negative terminal bar, a first ground connection 86 constructed and arranged to electrically connect the positive terminal bar to ground, a first breakable section A between the first ground connection and the positive terminal bar, a second ground connection 88 constructed and arranged to electrically connect the negative terminal bar to ground, and a second breakable section B between the second ground connection and the negative terminal bar. Capacitor structure 90 is attached to the terminal bar structure, and the first breakable section is selectively broken, alone or in combination with the second breakable section to provide versatile RFI suppression.

10 Claims, 7 Drawing Sheets

U.S. PATENT DOCUMENTS

| | | | |
|---|---|---|---|
| 5,747,901 A * | 5/1998 | Harada et al. | 310/71 |
| 5,872,411 A * | 2/1999 | Nakata | 310/71 |
| 5,942,819 A | 8/1999 | Burgess et al. | 310/51 |
| 5,949,173 A | 9/1999 | Wille et al. | 310/220 |
| 6,020,668 A | 2/2000 | Rubinchik | 310/239 |
| 6,104,110 A | 8/2000 | Uchida et al. | 310/51 |
| 6,404,093 B1 | 6/2002 | Bastide et al. | 310/239 |
| 6,448,676 B1 | 9/2002 | Kershaw et al. | 310/68 |
| 6,555,943 B2 | 4/2003 | Walther et al. | 310/239 |
| 6,900,563 B2 * | 5/2005 | Tyshchuk et al. | 310/68 R |
| 2002/0117931 A1 | 8/2002 | Campbell et al. | 310/238 |
| 2003/0048026 A1 | 3/2003 | Kershaw et al. | 310/238 |
| 2003/0111930 A1 | 6/2003 | Vacheron et al. | 310/239 |

\* cited by examiner

UNIVERSAL TERMINAL BAR STRUCTURE WITH GROUND CONTACTING FEATURE INTEGRATED INTO A BODY STRUCTURE WITH VERSATILE RFI SUPPRESSION FOR ELECTRIC MOTORS

This application is based on U.S. Provisional Application No. 60/550,474, filed on Mar. 5, 2004 and claims the benefit thereof for priority purposes.

FIELD OF THE INVENTION

The invention relates to permanent magnet direct current (DC) motors for automotive applications and, more particular, to a terminal bar structure that provides versatile RFI suppression.

BACKGROUND OF THE INVENTION

The functionality of permanent magnet direct current brush-commutated electric motors requires switching current from winding to winding. As the brushes slide from one bar to another an arching occurs due to the back electromotive force (EMF) generated by the stored electromagnetic energy in the current carrying coils. The arching generates broadband electrical noise over a wide frequency spectrum. The spectrum energy distribution is influenced by switching of coils (commutation) that is proportional to the motor speed.

There are two modes of conducted noise generated in a motor, differential mode and common mode. The differential mode filtering can be accomplished with a shunt capacitor connected across the positive and negative motor terminals and use of series inductors or ferrite beads (chokes) to reduce radio frequency (RF) noise currents. The common mode filtering is also accomplished by including series impedance in both leads in addition to referencing the shunt capacitor and the negative terminal to case. However, the motor case and vehicle ground must be at the same potential. If the case and vehicle ground are at different potential then the RF reference can be provided by an additional capacitor. This type of filtering is shown in FIGS. 1, 2, and 3.

FIG. 1 shows a conventional brush card assembly 10 for a two brush, four pole (permanent magnet) motor with a link wound commutator. In this case, the Radio Frequency Interference (RFI) filtering is realized by placing a capacitor 11 between the positive terminal bar 12 and negative terminal bar 14 that are directly connected to the respective chokes. The positive choke 16 is connected to the positive brush inside brush tube 18 via a shunt wire 20 and the negative choke 22 is connected to the negative brush inside brush tube 24 via shunt wire 26. Furthermore, a motor case/stator assembly is connected to the negative terminal bar 14 through the ground shunt wire 28. The ground shunt wire 28 is at the same potential as the vehicle ground. In this case, the terminal bars are insert molded into a connector body 30.

FIG. 2 shows a conventional brush card assembly 10' for a two brush, four pole (permanent magnet) motor with a link wound commutator. In this case, RFI filtering is realized by placing a capacitor 32 between the positive terminal bar 16 and motor case/stator assembly and another capacitor 34 between the negative terminal bar 14 and the motor case/stator assembly. Therefore, the motor case has the same potential as the vehicle ground. The terminal bars are directly connected to the respective chokes (the positive choke 16 is connected to the positive brush 18 and the negative choke 22 is connected to the negative brush 24 in the manner discussed above with regard to FIG. 1). In this case, the positive lead wire 36 and the negative lead wire 38 are attached to the terminal bars and the assembly is then over molded in a grommet 40.

FIG. 3a shows a conventional brush card assembly for a four brush, four pole (permanent magnet) motor. In this case, the RFI filtering is a bit more complex because there are four brushes used (two positive 18, 18' and two negative 24, 24') and there is a choke 37 connected between each brush and the respective power input terminal bar. As shown in FIG. 3b, two chokes are not seen since they are on the other side of the brush card. The capacitor 42 is connected between the positive terminal input bar 44 and the negative input terminal bar 46. The capacitor 48 is connected between the positive input terminal bar 44 and motor case/stator assembly. Also, the motor case/stator assembly has the same potential as the vehicle ground through the ground shunt wire 50. In this case, similar to the brush card in FIG. 2, the lead wires 36, 38 are attached to the terminal bars and the assembly is then over molded in a grommet.

FIG. 4 shows another conventional brush card assembly with four brushes for a four pole (permanent magnet) motor. However there are only two chokes used, one for both positive brushes and the other one for both negative brushes. The choke 52 is connected between the negative input terminal bar 46 and the brush 54 (negative brush). The choke 56 is connected between the positive input power terminal bar 44 and brush 58 (positive brush). The capacitor 60 is connected between the positive and negative input terminal bars. The capacitor 62 is connected between the positive input terminal bar and motor case/stator assembly. In this case, the negative terminal bar 46 has an extended feature 64 (instead of the ground shunt wire as shown in FIGS. 1, 2, and 3)) to make contact to the motor case/stator assembly. Therefore, the motor case/stator assembly still has the same polarity as the vehicle ground.

Although the construction of the brush card assembly for a four-brush configuration is significantly different from the two-brush configuration, the method of assembling the capacitors and grounding to motor case for RFI suppression are the same. The attachment of capacitors 32, 48, and 62 in FIGS. 2, 3 and 4, respectively, and capacitor 34 in FIG. 2 is manual labor intensive. Furthermore, paint must be removed (grinded off) from the stator/motor case at the contact area of ground strap shunt wire or the ground terminal bar in order to ensure proper grounding.

Therefore, a more universal and versatile terminal bar system is needed that can be more cost effective and that can accommodate automated assembly.

SUMMARY OF THE INVENTION

An object of the invention is to fulfill the need referred to above. In accordance with the principles of the present invention, this objective is achieved by a method of providing RFI suppression in a DC motor. The method provides a universal terminal bar structure including a positive terminal bar and a negative terminal bar, a first ground connection constructed and arranged to electrically connect the positive terminal bar to ground, a first breakable section between the first ground connection and the positive terminal bar, a second ground connection constructed and arranged to electrically connect the negative terminal bar to ground, and a second breakable section between the second ground connection and the negative terminal bar. Capacitor structure is attached to the terminal bar structure, and the first breakable section is selectively broken, alone or in combination with the second breakable section to provide versatile RFI suppression.

In accordance with another aspect of the invention, a universal terminal bar structure is provided for a permanent magnet DC motor. The structure includes a body structure, a positive terminal bar and a negative terminal bar, each being carried by the body structure, a first ground connection constructed and arranged to electrically connect the positive terminal bar to ground, a first breakable section between the first ground connection and the positive terminal bar constructed and arranged such that when the first breakable section is broken, the connection between ground and the positive terminal bar is terminated, a second ground connection constructed and arranged to electrically connect the negative terminal bar to ground, a second breakable section between the second ground connection and the negative terminal bar constructed and arranged such that when the second breakable section is broken, the connection between ground and the negative terminal bar is terminated, and capacitor structure attached to the terminal bar structure. Whereby placement of the capacitor structure and selectively breaking the first breakable section, alone or in combination with the second breakable section, provides selective radio frequency interference (RFI) suppression for the motor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 3b show a bottom side of the brush card assembly of FIG. 3a.

DETAILED DESCRIPTION OF THE EXEMPLARY EMBODIMENT

Figure 5:
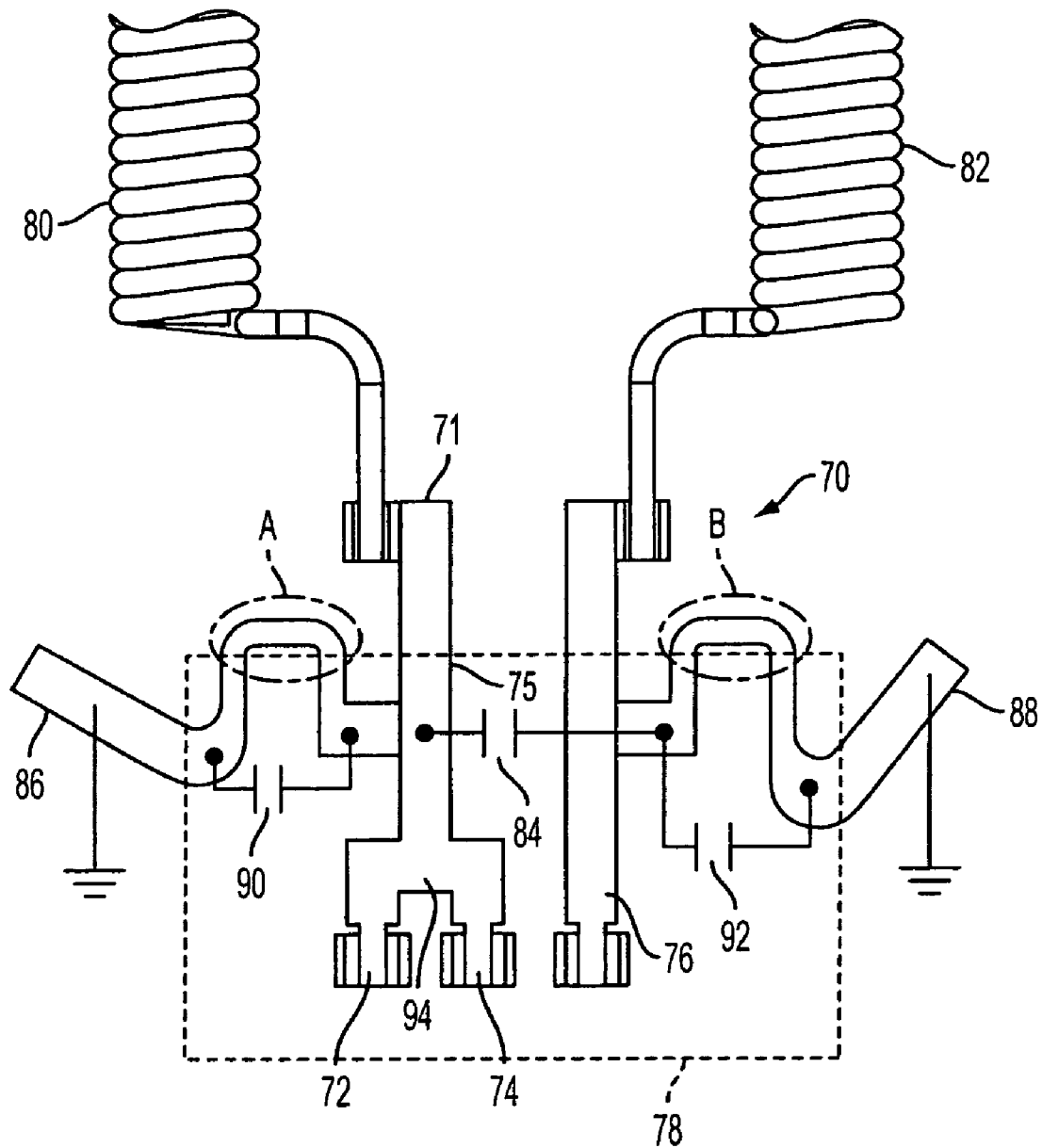
FIG. 5 is a schematic illustration of a terminal bar structure provided in accordance with the principles of the present invention.

With reference to FIG. 5, a terminal bar structure, generally indicated at 70, is shown in accordance with the invention. The terminal bar structure has a positive terminal bar 71, of a generally Y-shape defining a high-speed connection branch 72 and a medium speed connection branch 74 joined at a common member 75. The terminal bar structure 70 also includes a negative terminal bar 76. The terminal bar structure 70 can be cut-out/stamped-out on a progressive die as one piece or two pieces (the positive bar separate from the negative bar) or even multiple pieces. This depends on the construction and complexity of a molding die that is used for molding a grommet 78 or connector body structure around the terminal bar structure 70. If the terminal bar structure 70 is made as one piece, the positive terminal bar 71 must be separated from the negative terminal bar 76.

A break-off (breakable) section encircled at A in FIG. 5 is provided on the positive terminal bar 71 and a break-off (breakable) section encircled at B in FIG. 5 is provided on the negative terminal bar 76. These break-off sections can be selectively cut-off depending on the type of RFI suppression being used, as will be apparent below. In the illustrated embodiment, at least one choke 80 is attached to the common member 75 of the positive terminal bar 71 and at least one choke 82 is attached to the negative terminal bar 76. The chokes are directly attached to the respective polarity brushes (the brushes are not shown in FIG. 5). Additional chokes can be attached in series or in parallel to the positive terminal bar and negative terminal bar depending on the number of brushes used, or the level of RFI suppression required. If no chokes are provided, the positive brush can be connected directly to the positive terminal bar 71 and the negative brush can be connected directly to the negative terminal bar 76.

Figure 1:
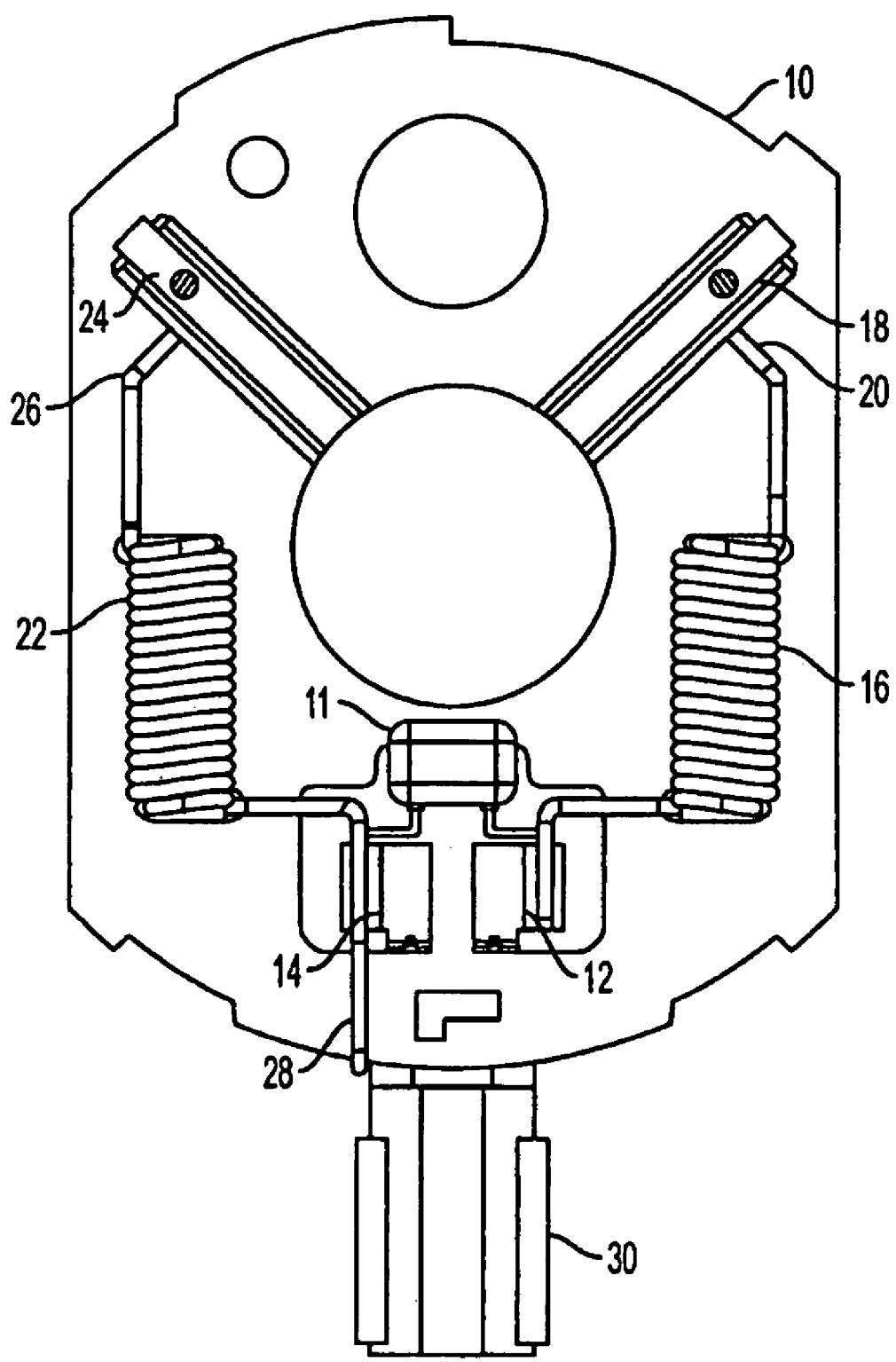
FIG. 1 shows a conventional brush card assembly for a two brush, four-pole permanent magnet motor with terminal bars molded into a connector body.

With the terminal bar structure 70, the following type of RFI suppressions can be achieved:

1. The Type 1 RFI suppression as shown in FIG. 1 can be achieved with the terminal bar structure 71 by attaching only capacitor 84 between the positive terminal bar 71 and negative terminal bar 76 as shown in FIG. 5. Furthermore, the break-off section A is removed/cut to break the contact of the positive terminal bar to motor case/stator assembly through the ground connection portion 86 of the positive terminal bar 71. However, the break-off section B remains part of the negative terminal bar 76; therefore, the motor case/stator assembly is connected to the vehicle ground through the ground connection portion 88 of the negative terminal bar 76.

Figure 2:
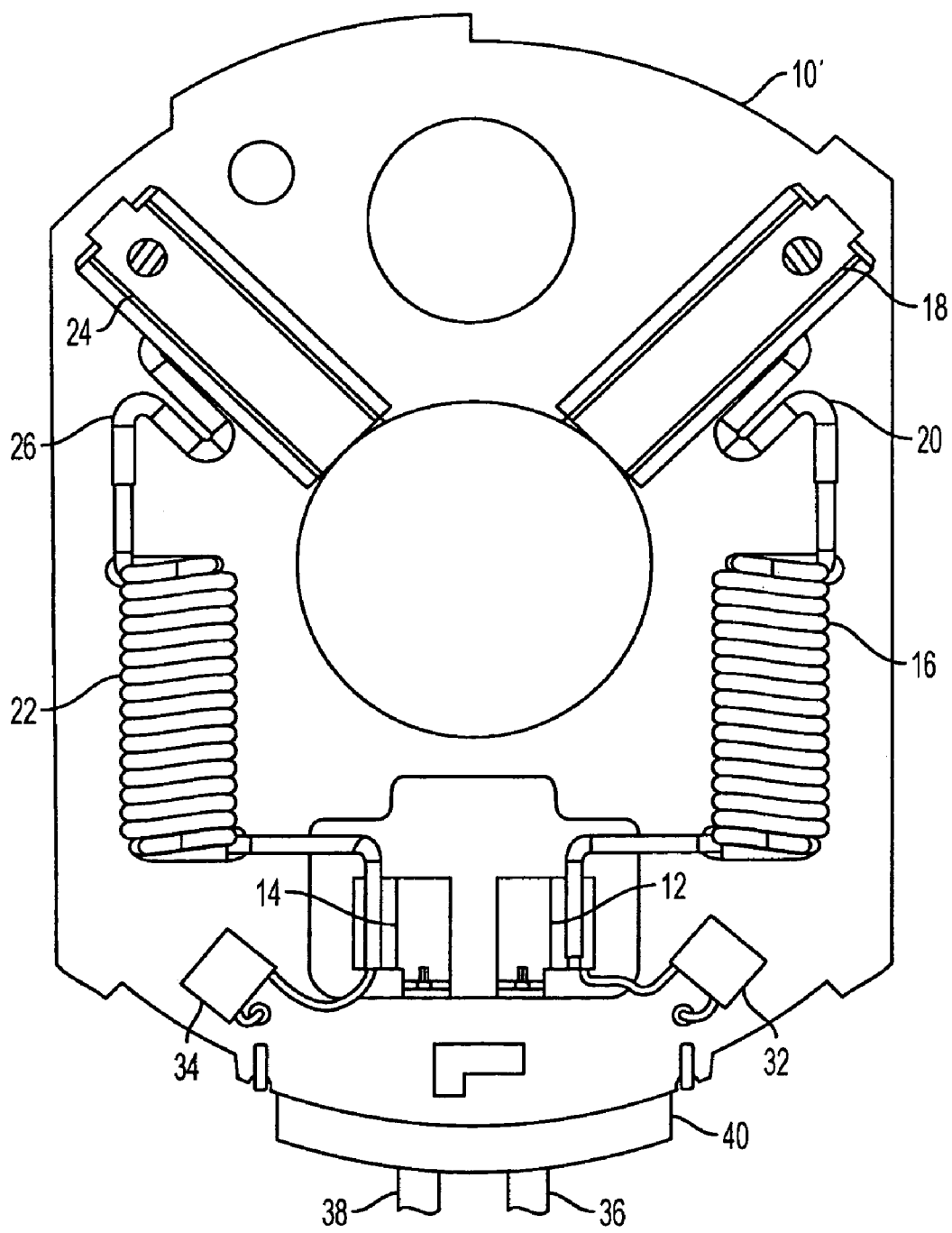
FIG. 2 shows a conventional brush card assembly for a two brush, four-pole permanent magnet motor with lead wires attached to the terminal bars when molded in a grommet.

2. The Type 2 RFI suppression as shown in FIG. 2 can be achieved with the terminal bar structure 70 by attaching capacitor 90 and capacitor 92 (but not capacitor 84) to the terminal bar structure 70 as shown in FIG. 5. Thus, capacitor 90 is electrically connected between the ground connection 86 and the positive terminal bar 71 and capacitor 92 is electrically connected between the ground connection 88 and the negative terminal bar 76. Furthermore, both break-off section A and break-off section B are removed/cut to eliminate direct contact of terminal bars 71 and 76 to motor case/stator assembly.

Figure 3A:
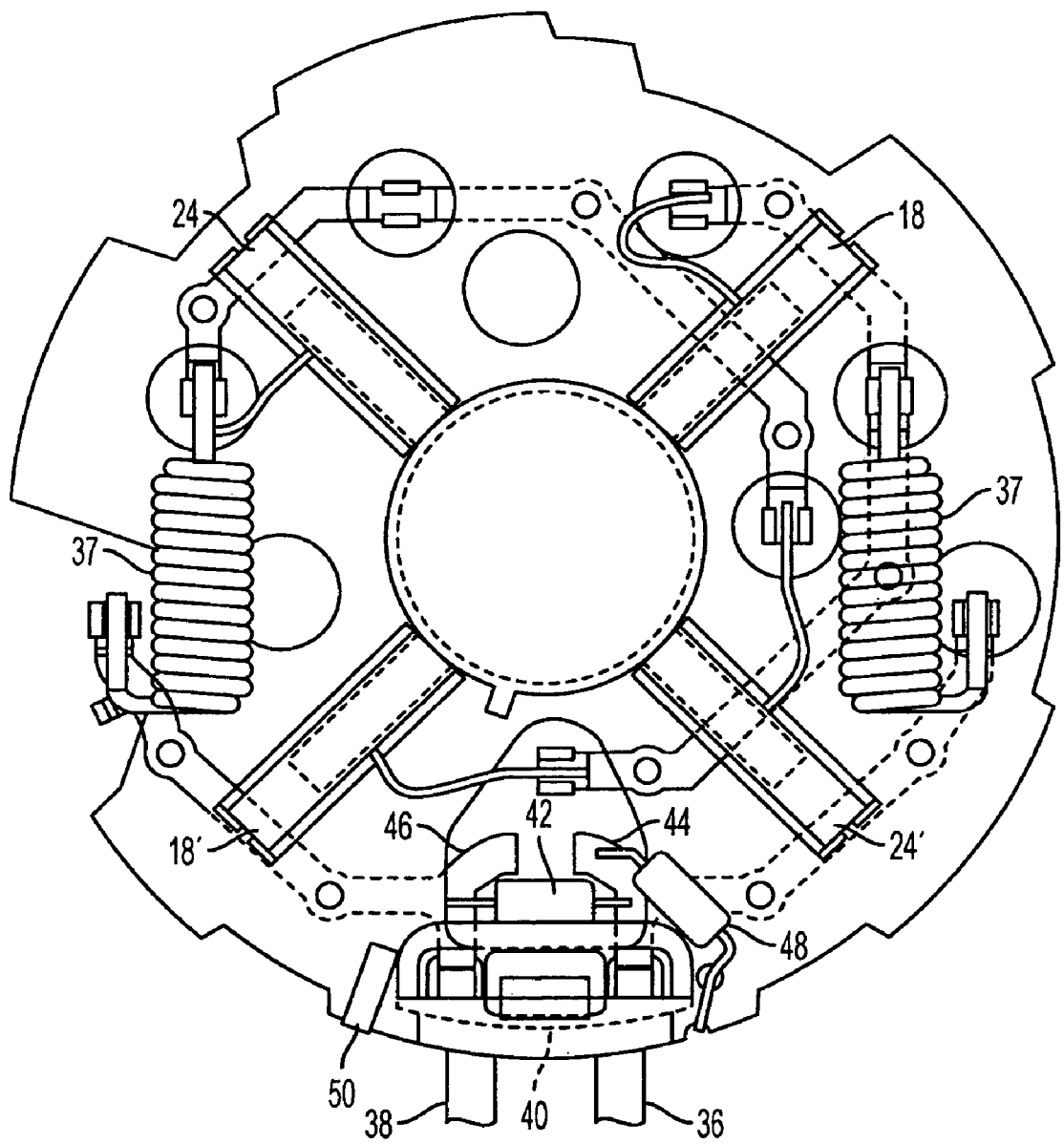
FIG. 3a shows a top side of a conventional brush card assembly for a four brush, four-pole permanent magnet motor with four chokes and with lead wires attached to the terminal bars when molded in a grommet.
Figure 3B:
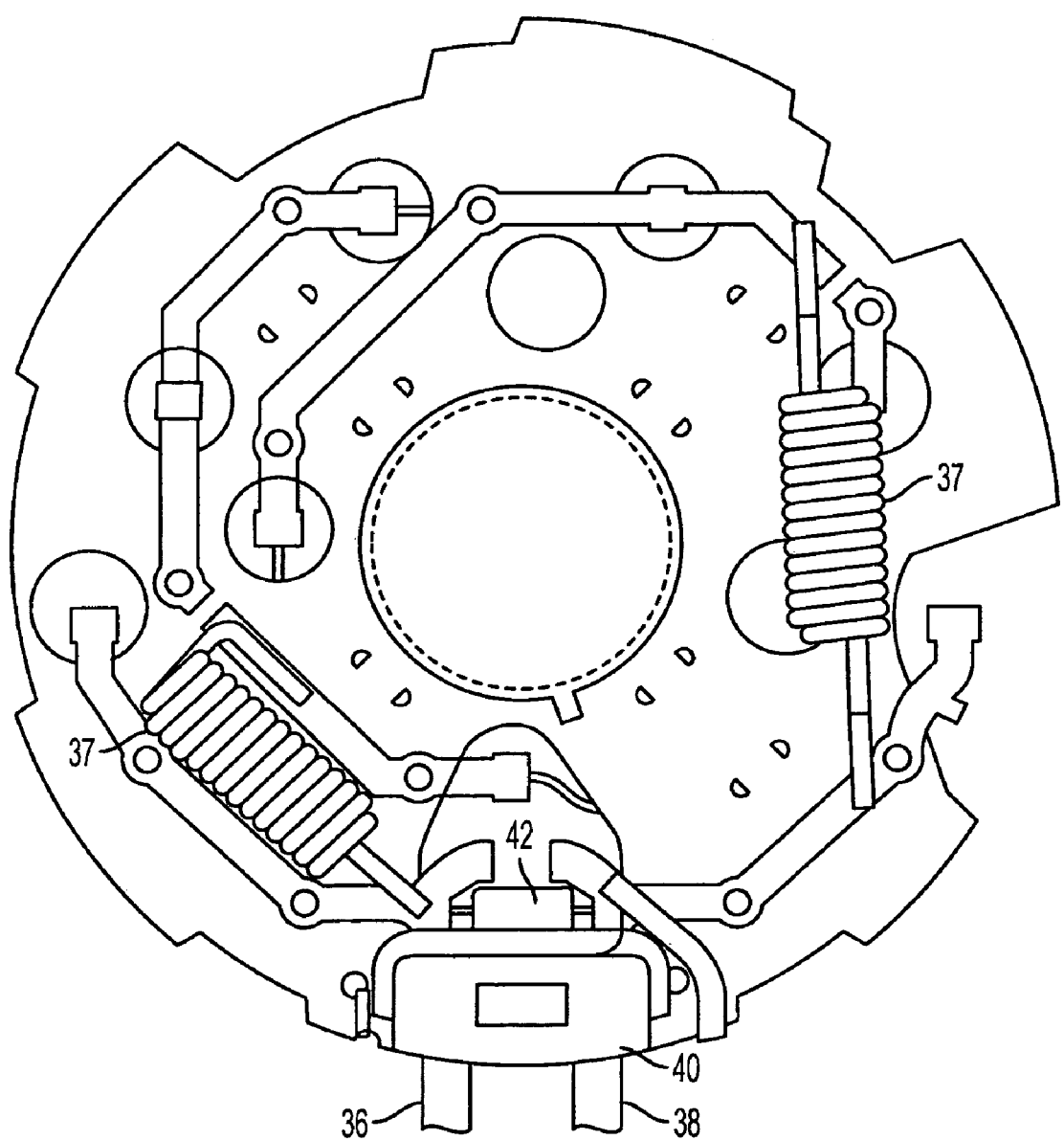
Figure 4:
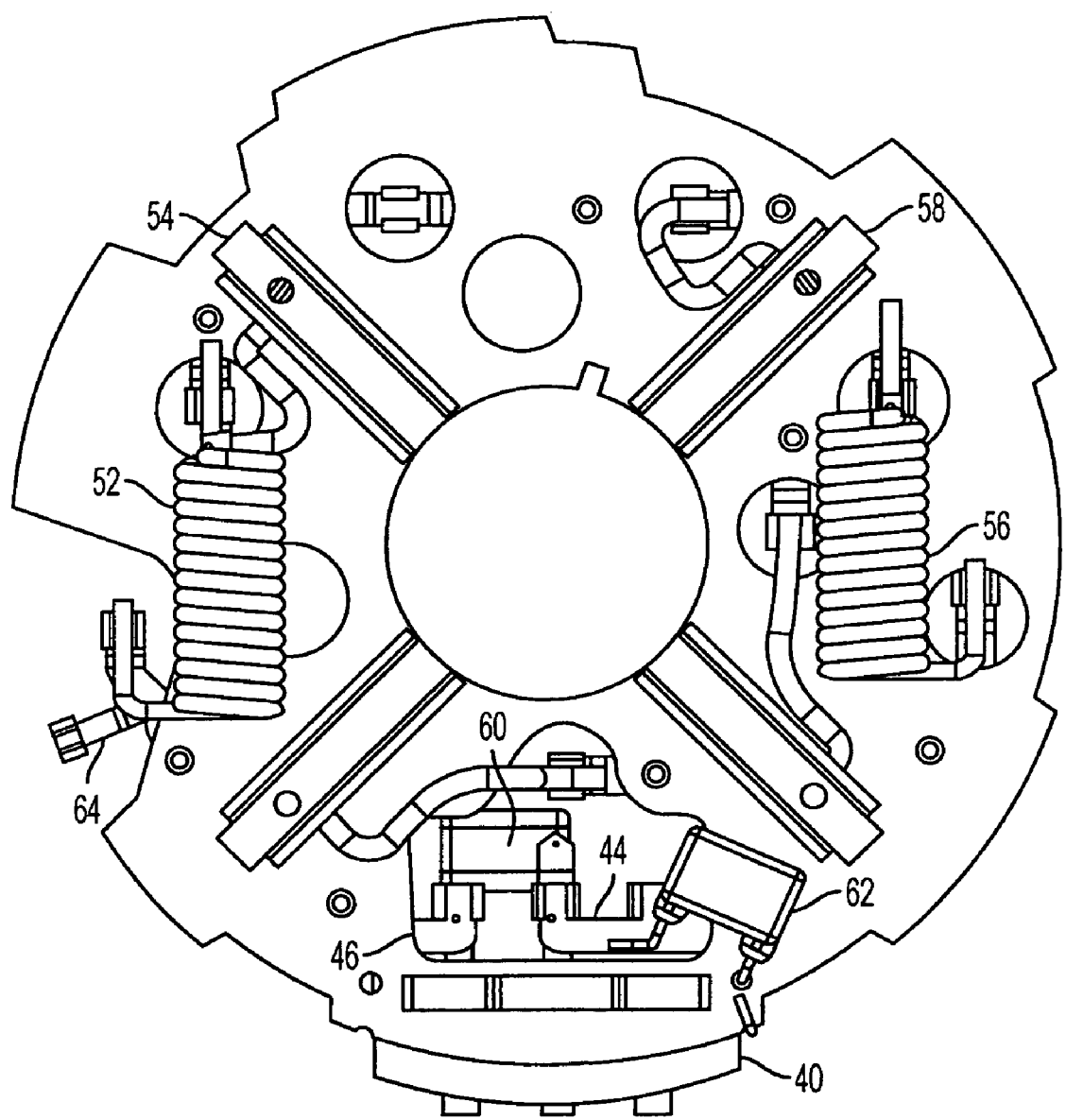
FIG. 4 shows a conventional brush card assembly for a four brush, four-pole permanent magnet motor having two chokes with a negative terminal bar having an extended feature to contact a motor case/stator assembly.

3. The Type 3 RFI suppression as illustrated on FIG. 3 and FIG. 4 can be achieved with the terminal bar structure 70 by attaching capacitor 90 and capacitor 84 (but not capacitor 92) to the terminal bar structure 70 as shown in FIG. 5. Thus, capacitor 90 is electrically connected between the ground connection 86 and the positive terminal bar 71 and capacitor 84 is electrically connected between the positive terminal bar 71 and the negative terminal bar 76. Furthermore, the break-off section A is removed/cut to break the contact of the positive terminal bar to motor case/stator assembly through the ground connection 86 of the positive terminal bar 71. However, the break-off section B remains part of the negative terminal bar 76; therefore, the motor case/stator assembly is connected to the vehicle ground through the ground connection 88 of the negative terminal bar 76.

Thus, breakable section A is always cut, broken or removed, and breakable section B is cut or broken only when capacitor 92 is employed. Providing the breakable sections A and B enables the terminal bars 72 and 76 to be cut out or stamped as explained above.

The capacitors are assembled, for example, by resistance welding/fusing or ultrasonic welding (however the assembly is not limited to these methods). The grommet or connector body 78 can be molded after or before the capacitors are assembled to the terminal bar structure 70. However, the positive lead wire 38 and the negative lead wire 36 need to be attached to the associated terminal bar before molding the grommet 78 around the terminal bars.

The advantage with the versatile terminal bar structure 70 is that the attachment of capacitor and ground connections can be automated. Also, the capacitors are placed on the terminal bar structure 70 based on the type and level of RFI suppression requirements. Therefore, with this structure, multiple type and levels of RFI suppression can be achieved.

Also, the same grommet or connector body structure 78 with the insert molded terminal bars can be used for one or two or even three positive power input applications. This requirement is quite common when one or two resistors are connected in series to the motor for two or three speed application. The advantage of this structure is that with the "flow through" feature 94 on the positive terminal bar 71 all positive power inputs are jointed and insert molded into the grommet or connector body 78.

Figure 6:
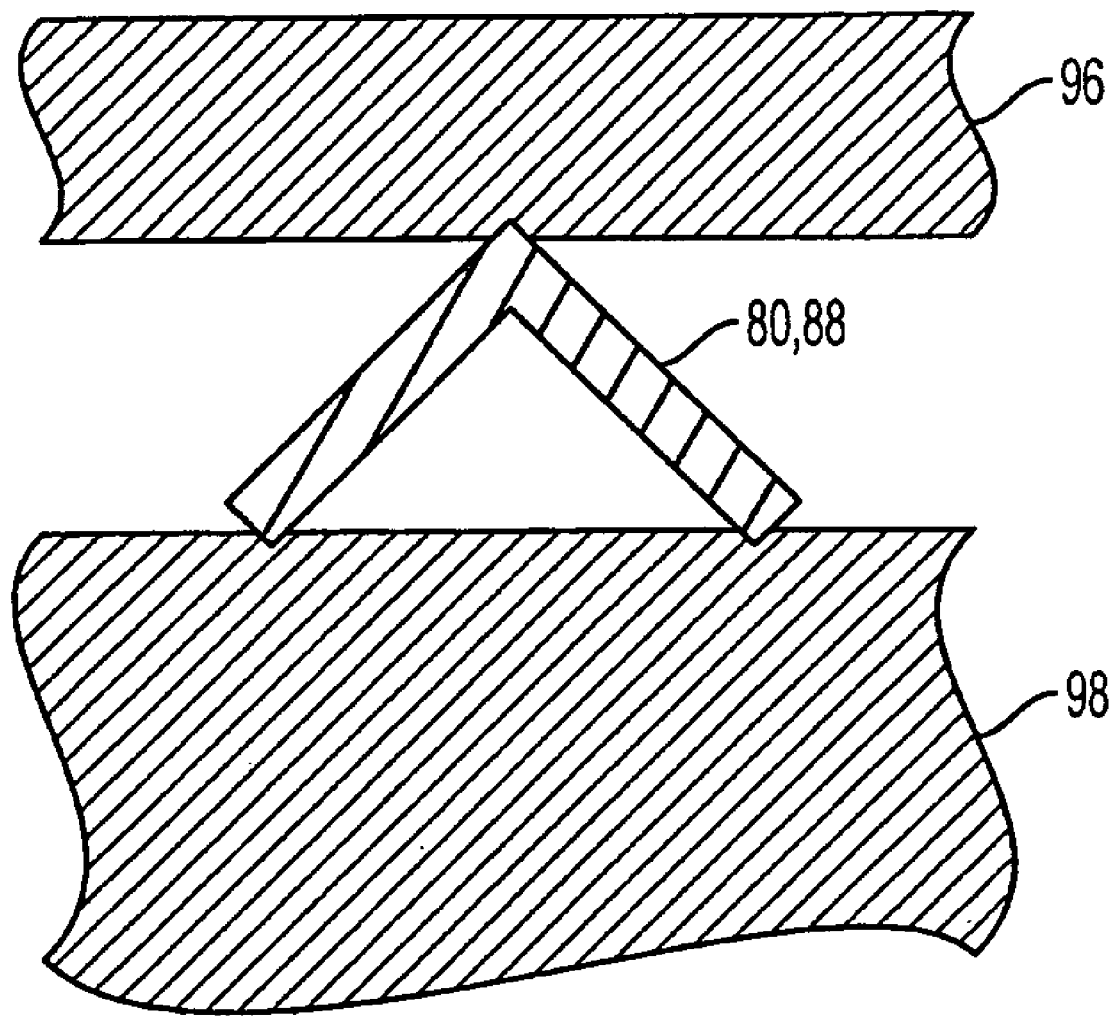
FIG. 6 is a partial sectional view of a ground connection of the invention being compressed between an end cap and the motor case/stator assembly.

Another advantage of the terminal bar structure 70 is the method of grounding to the motor case/stator assembly. This is illustrated in FIG. 6, where the ground connection 80, 88 of the terminal bar structure 70 is compressed between an end cap 96 of a motor and the motor case/stator assembly 98. Under compressive load the ground connection bar cuts into the motor case/stator assembly to ensure adequate ground connection.

Features of the Invention Include:

1. Integrate ground contact terminal bar into grommet or connector body structure.

2. Insert mold RFI suppression components into grommet or connector body structure.

3. Integrate FRI suppression component into grommet or connector body structure.

4. Insert mold terminal bar to grommet or connector body structure with flow through feature to accommodate for two or multiple terminal power inputs but with only two terminals to the RFI chokes or brushes.

5. A method of ground connection without grinding paint from the motor case/stator assembly.

6. Insert molded terminal bar with features such as the break-off sections that allow for a versatile RFI suppression assembly.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A terminal bar structure for a permanent magnet DC motor, the structure comprising:
    a body structure,
    a positive terminal bar and a negative terminal bar, each being carried by the body structure,
    a first ground connection constructed and arranged to electrically connect the positive terminal bar to ground,
    a first breakable section between the first ground connection and the positive terminal bar constructed and arranged such that when the first breakable section is broken, the connection between ground and the positive terminal bar is terminated,
    a second ground connection constructed and arranged to electrically connect the negative terminal bar to ground,
    a second breakable section between the second ground connection and the negative terminal bar constructed and arranged such that when the second breakable section is broken, the connection between ground and the negative terminal bar is terminated, and
    capacitor structure attached to the terminal bar structure, whereby placement of the capacitor structure and selectively breaking the first breakable section, alone or in combination with the second breakable section, provides selective radio frequency interference (RFI) suppression for the motor.

2. The structure of claim 1, wherein the body structure is a grommet and at least portions of the terminal bars are insert molded in the grommet.

3. The structure of claim 1, further comprising at least one first choke electrically connected with the positive terminal bar, and at least one second choke electrically connected with the negative terminal bar.

4. The structure of claim 1, wherein the body structure is a connector body and at least portions of the terminal bars are insert molded in the connector body.

5. The structure of claim 3, wherein the positive terminal bar includes a generally Y-shaped portion defining two legs that are joined to a common member, one leg defining a terminal bar connection for a certain speed operation of the motor and the other leg defining a terminal bar connection for operation of the motor at a speed less than the certain speed.

6. The structure of claim 5, wherein the at least one positive choke is connected to the common member of the positive terminal bar.

7. The structure of claim 1, in combination with the motor, the motor having an end cap and a motor case, wherein the first and second ground connections are compressed between the end cap and the motor case such that under compression, the ground connections cut into the motor case to create ground contact.

8. The structure of claim 1, wherein the capacitor structure includes a capacitor electrically connected between the positive terminal bar and the negative terminal bar, and wherein only the first breakable section is broken.

9. The structure of claim 1, wherein the capacitor structure includes a capacitor electrically connected between the first ground connection and the positive terminal bar and another capacitor electrically connected between the positive terminal bar and the negative terminal bar, and wherein the only first breakable section is broken.

10. The structure of claim 1, wherein the capacitor structure includes a capacitor electrically connected between the first ground connection and the positive terminal bar and another capacitor electrically connected between the second ground connection and the negative terminal bar, and wherein both the first breakable section and the second breakable section are broken.

* * * * *